April 17, 1962    H. B. BURT, JR., ETAL    3,029,750
SERVING-PORTION PRODUCING APPARATUS
Filed Jan. 8, 1959    5 Sheets-Sheet 1

INVENTORS:
HARRY B. BURT, JR.
PAUL E. WALTER
BY
ATTORNEYS

April 17, 1962 H. B. BURT, JR., ETAL 3,029,750
SERVING-PORTION PRODUCING APPARATUS
Filed Jan. 8, 1959 5 Sheets-Sheet 2

INVENTORS:
HARRY B. BURT, JR.
PAUL E. WALTER
BY
Kegan, Bellamy & Kegan
ATTORNEYS

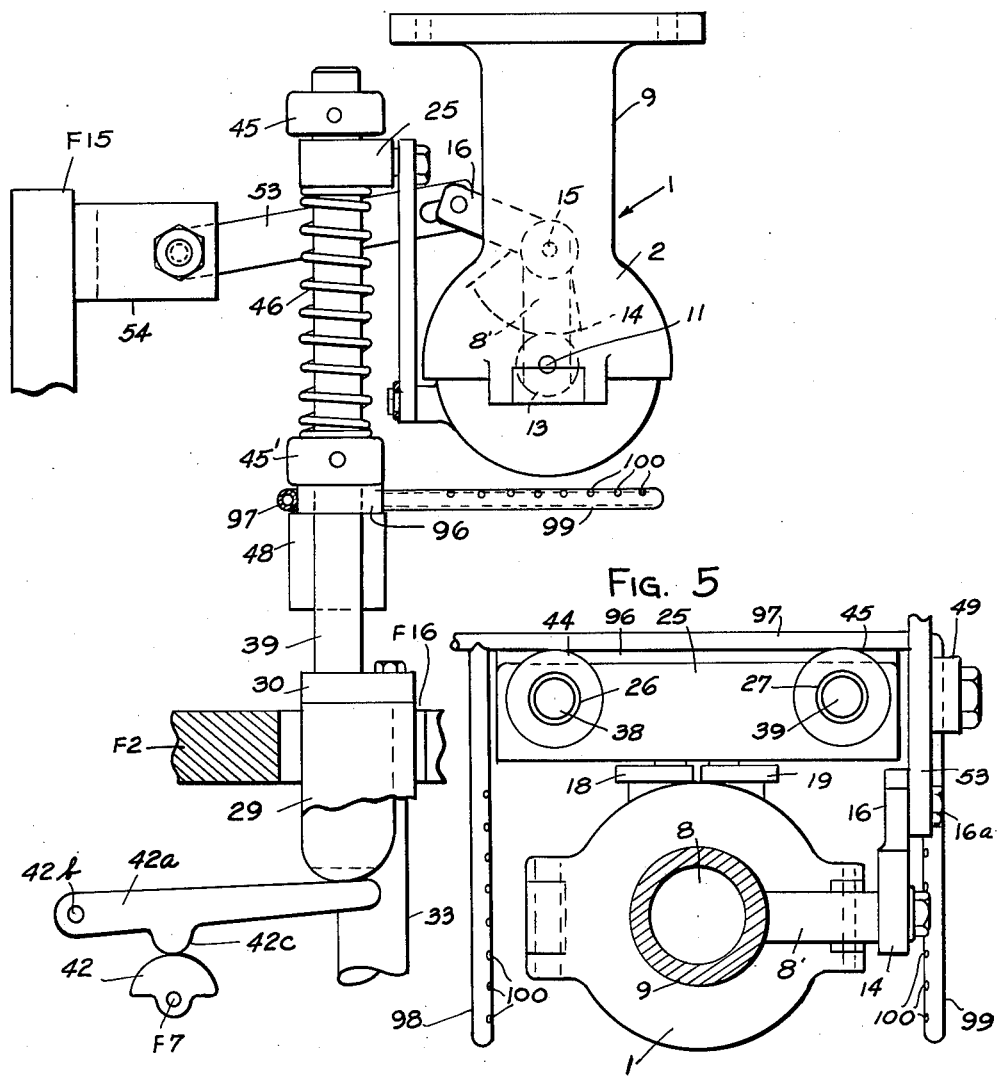

April 17, 1962 H. B. BURT, JR., ETAL 3,029,750
SERVING-PORTION PRODUCING APPARATUS
Filed Jan. 8, 1959 5 Sheets-Sheet 4
FIG. 6
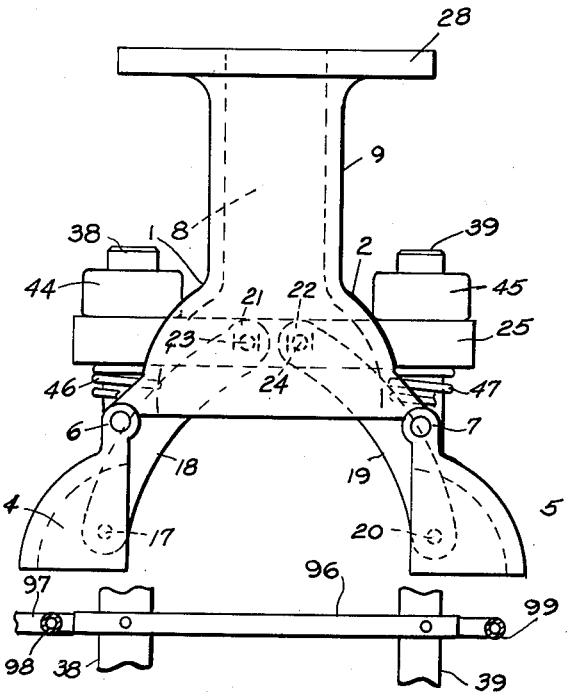
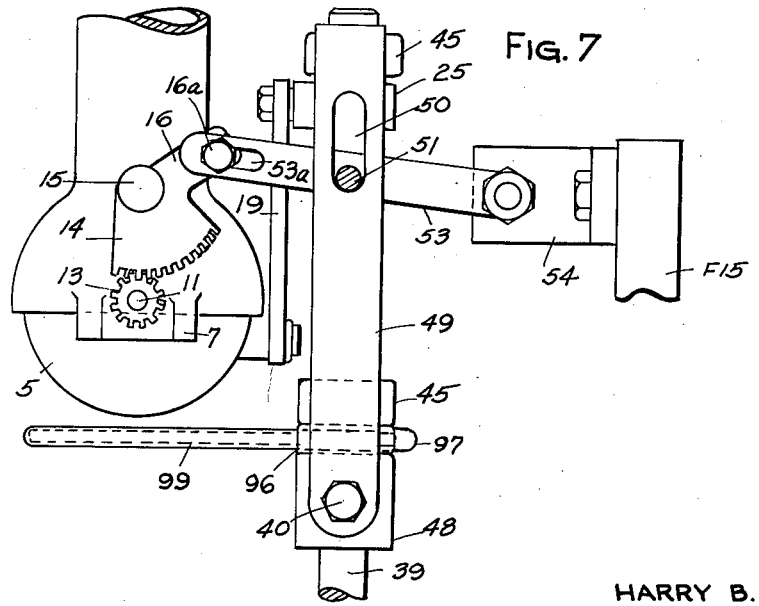
INVENTORS:
HARRY B. BURT, JR.
PAUL E. WALTER
BY
Kegan, Bellamy & Kegan
ATTORNEYS

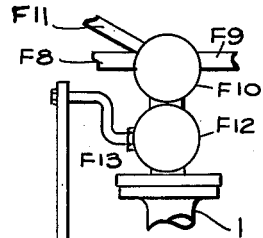
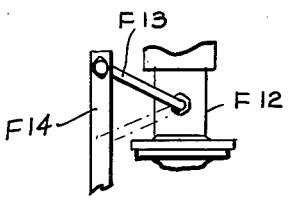
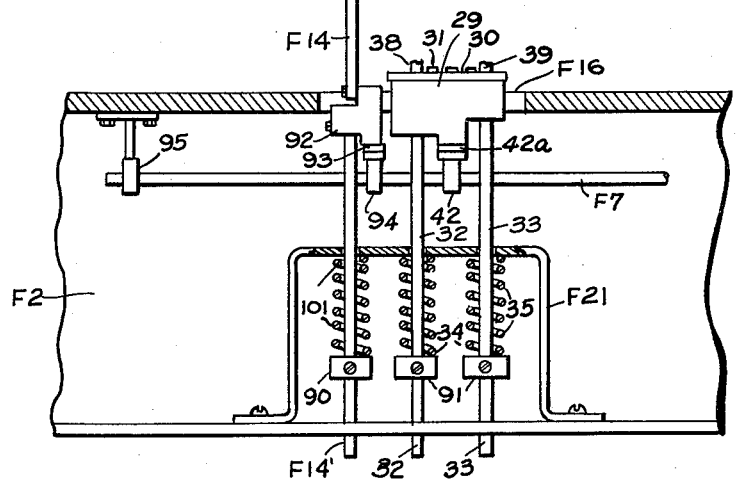
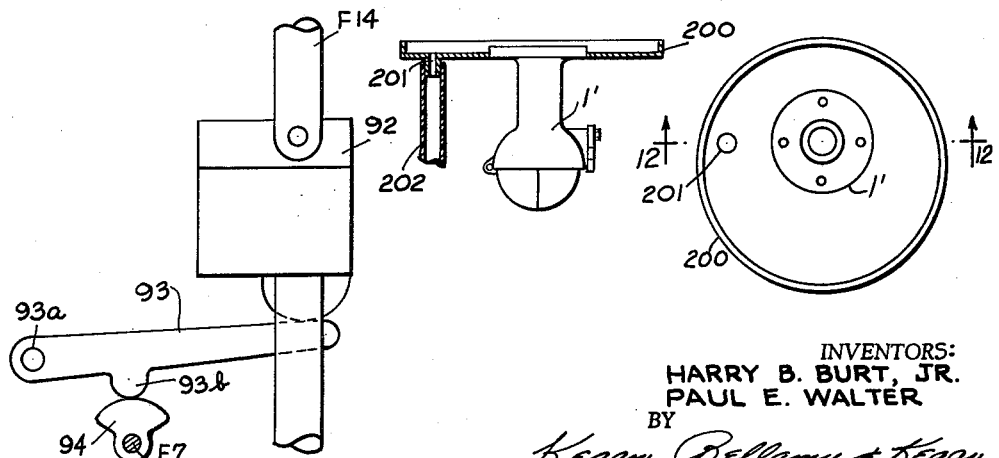

United States Patent Office 3,029,750
Patented Apr. 17, 1962

3,029,750
SERVING-PORTION PRODUCING APPARATUS
Harry B. Burt, Jr., and Paul E. Walter, Tulsa, Okla., assignors to Malt-A-Plenty, Inc., Tulsa, Okla., a corporation of Delaware
Filed Jan. 8, 1959, Ser. No. 785,739
18 Claims. (Cl. 107—8)

Our invention relates to apparatus for dividing moldable bulk food material into individual serving portions, although the apparatus may be useful in similarly acting upon other bulk material. The principal object of the invention is to provide apparatus for forming a succession of separated individual serving portions of an edible frozen product such as ice cream and the like, and for delivering the formed serving portions in succession for packaging or other desired disposition.

Reference is made to prior United States application, entitled Automatic Comestible Molding Apparatus, Serial No. 613,315, filed October 1, 1956, and now abandoned, the benefit of the filing date of which is now claimed herein in accordance with Title 35, U.S.C. §120.

It is well known that ice cream is commercially produced in bulk and is largely supplied in bulk to the dispenser, although sometimes in small cups, coated bars, and the like, each containing an individual serving portion. Ice cream is also supplied by the producer in multi-serving packages, pints, quarts, and so on, which the consumer separates into individual servings. Ice cream supplied in bulk to the dispenser is separated into individual serving portions as required, usually by the use of a suitable spoon or ice-cream scoop.

The task of dividing bulk or multi-serving quantities of ice cream into desired uniform portions is often tedious and time-consuming, as for example when a large number of patrons are ordering ice cream dessert at about the same time in a restaurant, cafeteria, ice cream parlor, and the like.

According to the invention, the foregoing dispensing and serving difficulties are overcome by providing apparatus suitable for use within the plant of the ice cream producer to divide the ice cream into individual serving portions which, after the usual further hardening (freezing), are suitable for packaging for delivery to dispensers, while retaining their shape during transportation and handling.

Further, according to the invention, apparatus herein disclosed is employed as desired to coat the formed serving portions to improve their taste and appearance, such coating being carried out between the formation of the serving portions and their introduction into the usual hardening chamber.

In carrying out the invention, it has been elected to employ a mold for forming the serving portions, such mold preferably comprising parts hinged together for movement between a closed position wherein the mold is filled and an open position for the discharge from the mold of a molded individual serving portion. Conveniently, the mold is arranged to form the serving portions in a generally spherical or ball shape, although the principles disclosed are applicable to the formation of portions of shapes departing considerably from spherical.

It is well known that ice cream as discharged under pressure from the usual ice-cream producing machine is relatively soft, rather than being hard frozen into a rigid unyielding mass. It is a feature of the noted mold construction that the mold is connectable to the output of an ice-cream producing machine, and is fillable (while closed) from the source of ice cream under pressure by opening a control valve for an interval just sufficient to fill the closed mold. Conveniently, the admission opening for the ice cream into the mold is through a fixed upper part of the mold, with the lower part of the mold being that which moves to open and close the mold.

Further features of the invention concern the division of the movable lower part of the mold into parts (two quadrants in the illustrative example) to avoid tearing, breaking, or otherwise substantially deforming the molded individual portion by suction or adhesion, such as might occur if the hinged lower portion of the mold were in one piece.

According to a further feature, the time required to fill the mold is rendered quite small, with a substantial pressure head behind the ice-cream supply, by providing a relatively large sprue passage into the mold, which construction leaves the newly molded serving portion attached to the ice-cream supply by a sprue of a relatively large diameter. An associated feature is that this sprue is cut by a stripper blade which is preferably of semi-circular form and which, when the mold is opened, is moved through a sufficient angle to completely loosen the molded portion from the fixed upper part of the mold and to sever the molded portion from the sprue.

According to an additional feature, such tendency as may be encountered for the molded portion to adhere to the quadrants when they are being moved toward open position, under certain surrounding temperature conditions as related to the temperature and consistency of the supplied ice cream, is minimized by supplying a mild amount of heat to the quadrants themselves. In the illustrative example, this heating is conveniently performed by jet structure which blows mild jets of heated or warmed air against the closed quadrants.

The movement of the stripper blade, to be effective, should occur only after some opening movement of the mold has occurred to insure that the molded portion is not under such pressure as to cause readherence in regions already traversed by the stripper blade, and should not be completed before the opening of the mold is sufficient to permit the molded portion to drop free of the lower portion of the mold. Conveniently, the structure for operating the stripper blade is controlled from the structure which opens and closes the mold, being connected thereto through a suitable lost-motion arrangement.

The above-mentioned and other objects and features of this invention, and the manner of obtaining them, will become more apparent, and the invention will be best understood by reference to the following description of the invention taken in conjunction with the accompanying drawings comprising FIGS. 1 to 12, wherein:

FIG. 1 discloses a general left-side view of a forming machine F and a coating machine C according to the invention;

FIG. 2 shows a front view of the mold 1 and related mechanism of FIG. 1;

FIGS. 3 and 4 are views along lines 3—3 and 4—4 of FIG. 2;

FIG. 5 is a top view, partly in section, of the structure shown in FIG. 2;

FIG. 6 shows the mold 1 in open position;

FIG. 7 is a partial view of the apparatus of FIG. 2 as seen from the left side of the machine F of FIG. 1;

FIGS. 8 to 10 are views illustrating the operation of the admittance valve F12 of FIG. 1 in relative to the operation of the moving parts of the mold; and FIGS. 11 and 12 are a top view and a front sectional view of a modified mold having a catch pan attached.

Figure 1:
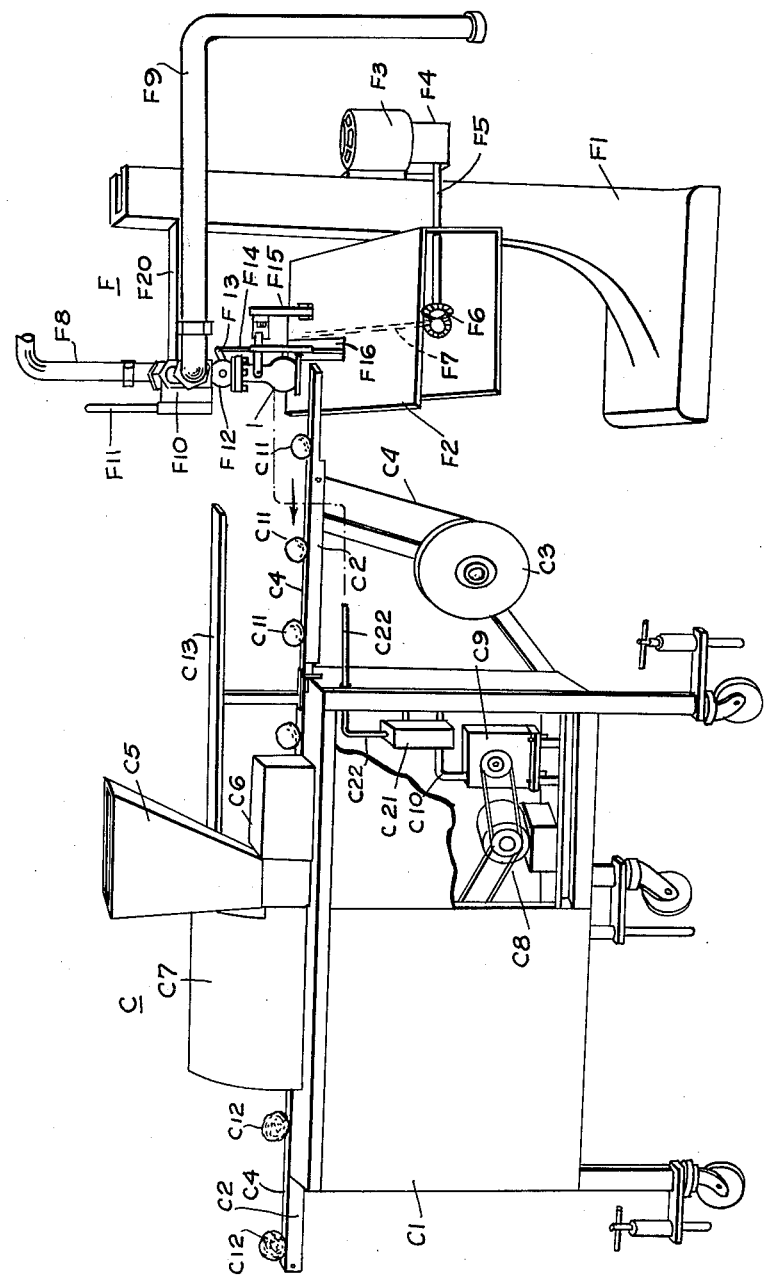
Figure 3:
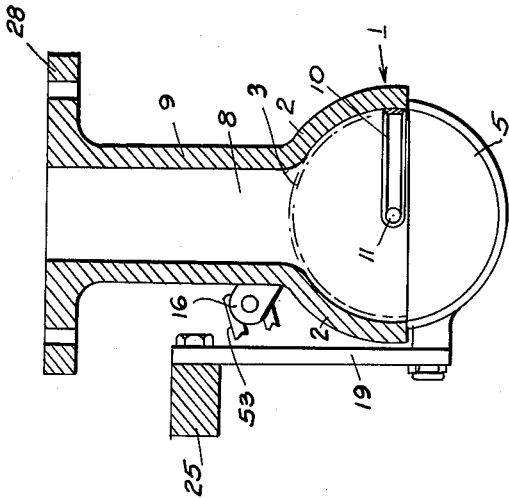

Referring particularly to FIG. 1, which shows an overall view from the left side of the former F and the coater C, the formed serving portions, or ice-cream balls, C11, are discharged in succession from mold 1 of F onto conveyor C4 which carries them in the direction of the arrow through the tunnel-like coating chamber C7, wherein the coating material is applied thereto, when coating is desired, by being impelled from various directions as disclosed in our noted application, Serial No. 616,533, to appear beyond the coating chamber as a succession of coated balls C12.

As coated balls C12 reach the end of the conveyor C4, they may be preliminarily packaged, in groups of four in one example, by collecting them in a suitable open-ended trough (not shown) of waxed cardboard. At one common rate of production of forty coated balls a minute, ten such preliminary packages a minute are produced. Such packages may be placed in groups on trays (not shown) and the trays may be placed promptly in the usual refrigerated hardening room prior to final packaging for distribution.

Briefly, the coater C is a cart-like structure supported on three legs as shown. The conveyor C4 includes structure for supporting a moving ribbon-like sheet of waxed paper supplied from roll C3 and passed over suitable rollers (not shown). It is continuously pulled over the conveyor structure by a clutch-like roller mechanism (not shown), driven by motor C4, and may be conveniently wound on a waste roll for disposition. Coating material, such as shredded cocoanut, chopped nut meats, small candies, and the like, may be introduced through the hopper C5 and fed into chamber C7 as by a suitable worm (not shown) in gear box C6, also operated by motor C8.

Motor C8 also operates air compressor C9 which supplies compressed air by way of tube C10, and heater C21 to hose C22, for supply to the warm-air jets of mold 1, hereinafter described. C21 may be electrically heated to bring the temperature of the air supplied through C22 to the desired value.

Referring particularly to FIGS. 1, 4, and 8, former F comprises apparatus supported on shelf structure F2 and arm F20 attached to upright F1, which also supports electric motor F3, having gear box F4.

Supply pipe F8 receives ice cream under pressure from a suitable ice-cream machine or other source (not shown), and leads to the inlet of manual valve F10 having handle F11 through which F10 can be actuated to supply the received ice cream through control valve F12 to mold 1, or can be shifted, when desired, to divert the product through waste pipe F9 to be caught in a suitable receptacle (not shown) for reprocessing or other desired disposition. Valve F10 is suitably supported on arm F20 carried by upright F1.

Control valve F12, the body portion of which may be formed integrally with the body of valve F10, has an outlet flange to which the inlet flange 28 (FIG. 2) of mold 1 is bolted. Valve F12 is controlled by crank handle F13, being open when F13 is in its raised position shown in FIGS. 1, 8, and 9, being closed when F13 is lowered. F13 is controlled through valve rod F14 through the action of cam 94, cam follower 93, and cam block 92 attached to rod F14. Rod F14 is pivotally attached to block 92. Rod F14′ passes slidingly through support openings in bracket F21 and the lower ledge of F2. Collar 90, attached to F14′, as by a set screw, is contacted by the lower end of the illustrated encircling return spring, which coacts with the under side of bracket F21 to force the valve-control structure down, to close valve F12, when cam 94 (FIGS. 8 and 10) relaxes its upward force through 93 and 92.

Through gear box F4, motor F3 drives shaft F5, which, through bevel gears F6, drives cam shaft F7. In practice, shaft F7 is rotated to about forty revolutions a minute, to cause a new serving portion, or ball C11, to be formed at mold 1 on each revolution. Faster and slower operation, of course, may be employed whenever desired, for which purpose the speed of shaft F7 may be adjusted at gear box F4, or by varying the speed of motor F3, or both.

Mold-control cam 42 (FIGS. 2, 4, 8), which is secured as by a set screw to cam shaft F7, along with valve-control cam 94, controls the closing and opening of the mold 1 in timed relationship with the opening and closing of the valve F12. This control is exercised through cam lever 42a, pivoted at 42b, and having a depending follower portion 42c. Lever 42a contacts the lower rounded portion of block 29, which is slidable up and down by being rigidly attached to the upper end of each of two guide rods 32, 33. Rods 32, 33 slide freely in guide openings through bracket F21 and the lower ledge of F2, and are biased downwardly by their illustrated encircling compression springs, acting between the lower side of bracket F21 and collars 91. Accordingly, block 29 is raised and lowered, along with valve-control block 92, once for each revolution of cam shaft F7. Preferably, mold-control block 29 is up during about half of each revolution of the cam shaft because of the semicircular shape of cam 42 (see FIG. 4), but valve-control block 92 is up substantially less than half of the time because of the lesser angular extent of cam 94 (see FIG. 10), since it is desired that valve F12 open only after the mold closes and that the valve again close before the mold opens.

Figure 2:
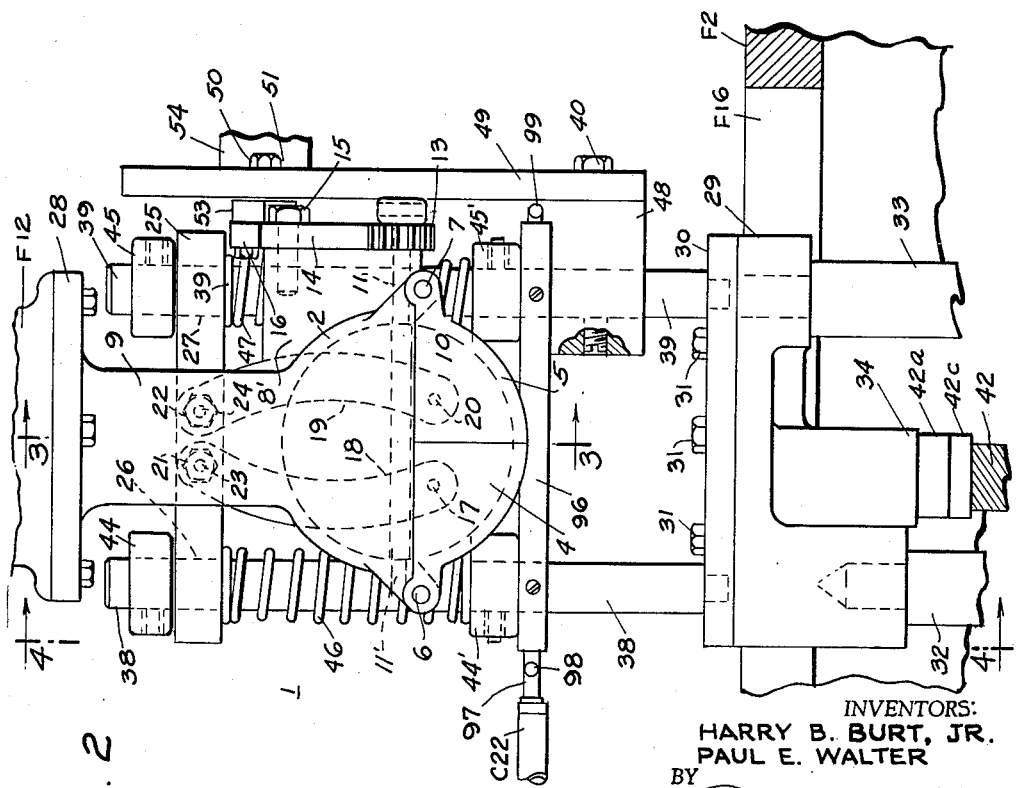

The closing and opening of mold 1 responsive to the described raising and lowering of block 29 by cam 42 is performed through upwardly extending rods 38 and 39 attached to cap yoke 30, which is attached to the top of block 29 by screws 31 (FIGS. 2, 4, 8).

Referring in detail to FIGS. 2 to 7, the mold 1 of FIG. 1 comprises a flange 28 for attachment, as by bolts, to the outlet flange (FIG. 2) of food valve F12, a hollow shank 9 having sprue passage 8, and the hollow spherical mold proper, comprising an upper hemispherical portion 2 and a lower hemispherical portion in the form of two quadrants 4 and 5, hinged to the fixed mold structure at 6 and 7.

Pivotally attached to quadrants 4, 5 at 17 and 20 are the lower end of links 18, 19, the upper end of each being pivotally attached to bar 25 to close and open the mold, by turning quadrants 4 and 5 about their respective hinges 6 and 7 as bar 25 is raised and lowered as hereinafter explained.

Bar 25 has clearance openings 26 and 27 through which rods 38 and 39 are received. Rods 38 and 39 are fastened, preferably by welding, to a cap plate 30 which is permanently attached to block 29 by screws 31.

When, in the course of a revolution of main shaft F1, cam 42 first raises block 29, upper rods 38, 39, and lower rods 32, 33, to their uppermost position, this upward movement is partly performed against the force of the upper and lower springs. When, later, cam 42 disengages block 29, said force of the said compressed spring together with the weight of the structure, causes it to go down again into its normal position where is stays until cam 42, during a new revolution of main shaft F1, re-engages block 29 for another upward movement. Rods 38, 39 carry collars 44, 45 and collars 44′, 45′, fixed in place by set screws. Between collars 44′ and 45′ and bracket 25, and centered around shafts 38 and 39, respectively, are compression springs 46 and 47. Bar 25 is thus yieldingly supported by springs 46, 47 to take part in the up and down movement of the rods 38, 39 with the described cam-controlled movement of block 29.

The lower collars 44′ and 45′ are set to maintain springs 46, 47 under desired tension, and the upper collars 44, 45 are preferably so set by their set screws that, in the uppermost position of bracket 25, closed position of mold 1 (FIGS. 1 to 4 and 7), a small separation gap exists between the collars and bracket. This assures reliable closure of the mold and that it is held closed only by spring tension, avoiding damage or breakage of the parts.

Referring to FIGS. 2, 3, 4, 5, and 7, a semicircular stripper blade, or knife, 10 is positioned within mold 1, being pivoted at each end to the upper hemispherical portion 2 and arranged to travel against the inner surface thereof to free the molded ice cream ball from the upper portion of the mold and also to cut it off from the sprue in stem 9 when the mold is opened. One end of 10 has a short shaft 11' which enters a blind pivot hole in the mold, as shown in dotted outline in FIG. 2. Extending outwardly through boss 8' of mold 1, and attached to blade 10, is a rotatable drive shaft 11. A gear 13, keyed to shaft 11, is driven by gear segment 14, mounted on shoulder-screw 15. The relationship between gear 13 and segment 14 is such that a slight rotation of 14 causes gear 13 to rotate stripper blade 10 through an arc of approximately 180 degrees.

The drive of the stripper blade 10, by segment 14 is derived from the described up and down mold-control movement of rod 39, to which block 48 is fastened by a set screw (FIG. 2). Vertical bar 49 is pivoted to the outer surface of block 48 by shoulder bolt 40, and has a lost-motion slot 50 through which it drives pivot member 51 secured to lever 53. Lever 53 is pivotally connected to angle bracket 54, permanently attached to the body of the machine through standard F15 (FIGS. 1 and 7). The free end of lever 53 carries a slot 53a which receives drive pin (shoulder bolt) 16a of drive lever 16 of gear segment 14.

Lost-motion slot 50 acts to cancel the first part of the up and of the down movement of main mold-control yoke 29 as regards stripper blade movement, the purpose being to delay operation of the stripper blade on down movement until the mold is opened far enough that, by the time the molded ball is cut loose and dropped by blade 10, quadrants 4 and 5 have been rotated clear of the path of the falling ball.

As shown best in FIG. 2, the warmed compressed air supplied through hose C22 extends to an air tube 97 which is fastened, as by welding, to bar 96. As seen also in FIGS. 4 to 7, bar 96 is affixed as by screws to upper rods 38, 39. Tube 97 leads to jet arms 98 and 99, which extend forwardly alongside of the lower portion of quadrants 4 and 5 in closed position. Jet arms 98, 99 are provided with small jet openings 100, facing upwardly and inwardly toward the quadrants 4 and 5. The warm-air jets coming from openings 100 strike quadrants 4 and 5 and warm them sufficiently to promote breakaway of quadrants 4 and 5 by causing the molded ball to melt slightly or film-like where contacted by 4 and 5.

FIGURES 11 and 12 show drip pan 200 secured eccentrically, as by welding, to flange 28 of mold 1, to catch any drippings that may fall from valves F10 and F12 or other overlying parts during operation of the apparatus, as from valve-stem leakage and the like.

Drain pan 200 has small vertical wall at its circumference, and has an outlet nipple 201 to which a flexible drain tube 202 is secured. The drip pan and its drain tube insures that the noted drippings, when present, are not permitted to reach the ice-cream ball formed and discharged by mold 1.

The operation of the described molding structure is as follows:

The motor F3 drives through gear box F4, drive shaft F5 at a reduced speed, which in turn drives over bevel gear F6 the cam shaft F7. The two cams 42 and 94, during one revolution of cam shaft F7 cause, as previously described, the following operations:

(a) Closing the mold, caused by cam 42, raising the mold control structure including bracket 25 and links 18, 19;

(b) Opening the valve, for feeding the mold, caused by cam 94, raising the valve control structure including rod F14 and valve crank F13;

(c) Closing the valve, caused by disengagement of cam 94 and lowering the valve control structure;

(d) Opening the mold, caused by disengagement of cam 42 and lowering the mold control structure.

Through the yielding arrangement of bar 25 on springs 46, 47, the closing of the mold is somewhat elastic and consequently any excess filling of the mold will cause a slight opening of it and a squirting out of the excess charge.

During the last portions of the travel of quadrants 4, 5 (while closing and opening the mold), the stripper blade 10 performs a semicircular movement, cutting off during mold opening period the upper half of the ice cream ball, so that it may drop on the conveyor beneath.

When the machine is first started, for example in the first morning hours, the feed pipe F8, valves F10 and F12, and mold 1 may have normal room temperatures and the ice cream in them may not have the consistency required for keeping the shape while subsequently passing through the coating machine. Under such conditions, manual valve F10 is operated to alternate position, by its lever F11, whereby the ice cream of somewhat soft consistency is diverted into the discharge pipe F9 for collection in a receptacle (not shown) for such disposition or reprocessing as may be desired.

After feed pipe F8 has cooled off sufficiently to keep the ice cream at the required temperature and consistency for forming and coating, manual valve F10 is turned back into its normal discharge position into the control valve F12, for passage into the mold.

Since control valve and mold have not yet been cooled, the first formed ice cream balls may not have the required consistency. They may be diverted by hand into a receptacle (not shown) for reprocessing or other disposition.

When the stage of normal production has been reached, the noted diversion by hand is terminated, permitting the molded articles C11 to travel along the conveyor C4, FIG. 1.

With manual valve F10 of FIGS. 1 and 8 restored to its illustrated position by handle F11 to place the supply under pressure from supply pipe F8 into the cyclic control valve F12 instead of into the diversion path through waste pipe F9', with the conveyor C4 of FIG. 1 in its described operation from motor C8, and with warmed air under suitable pressure being supplied through hose C22 and jet tubes 98, 99, as seen best in FIGS. 2, 5, and 6, to jet openings 100 (FIG. 5); and with motor F3 driving cam shaft F7 through items F4 to F6, mold 1 and control valve F12 are operated repeatedly and in timed relation by the described cams 42 and 94 (FIGS. 4 and 10, respectively) carried by shaft F7, the operation of the mold and of the control valve being through described structure controlled by these cams 42 and 94. Each such operation produces and drops a molded ball C11 (FIG. 1) onto the conveyor C4, causing a succession of such molded balls of ice cream or other desired frozen dessert to be moved along the conveyor for packaging or grouping at the discharge end thereof, coated or not, as desired.

The cams 42 and 94 are illustrated in FIGS. 4 and 10 in the position they occupy at about the middle of the closed interval of mold 1 and of the open interval of control valve F12.

As cams 42 and 94 continue to rotate and to hold cam levers 42a and 93 up, cam 94 allows its lever 93 to drop while cam 42 is still holding lever 42a in its illustrated uppermost position. When that occurs, cam block 92 is lowered by gravity and by its restoring spring 101 of FIG. 8, lowering control rod F14, pivotally secured between block 93 and crank arm F13 of valve F12, closing valve F12 to terminate the discharge of the moldable product into the cavity of mold 1, which operation is calculated to occur just as the cavity of the mold has become filled. Overfilling of the mold, when it occurs, results merely in the hinged quadrants 4 and 5 (see FIG. 2) being forced to open slightly to allow the excess to be discharged without damage to the mold, such slight opening occurring by a slight compression of springs 46 and 47 upon the lowering of bar 25 through downward force on links 18, 19.

For a given consistency and pressure of the supplied product, and for a given rate of cycle repetition of the control cams (say 40 to 46 per minute), any observed tendency of the mold to overfill may be corrected by partially moving lever F11, clockwise as seen in FIG. 8, to thus partly restrict the communication between the supply pipe and the entrance to control valve F12, but without causing loss of the product through discharge pipe F9. However, the more common practice for molding ice cream is to connect the entire output of a commercial pump-fed ice-cream freezer (not shown) over pipe F8 (FIGS. 1 and 8) to the molding apparatus with no storage other than that afforded by the compressibility of the newly formed ice cream in the freezer and in pipe F8, keeping in mind that commercial ice cream contains a substantial admixture of air. Then, valve F10 is left in full-open position with respect to cam-actuated valve F12, and the mold is caused to be just filled each time valve F12 is cam-opened by regulating cam shaft F7, as described, to turn faster or slower to thereby give shorter or longer open periods of valve F12. When this is done, the rate of volume output of fully molded portions C11 equals the rate of volume production by the freezer.

Shortly following the noted passage of the raised portion of cam 94 into ineffective position, to permit control valve F12 to be closed to terminate the filling operation, mold-control cam 42 reaches an ineffective position, allowing levers 42a to drop under the weight of the parts resting thereon and under the restoring force of springs 34, 35 of FIG. 8, whereupon the mold is quickly opened. That is, the quadrants 4 and 5 are impelled from their closed position seen best in FIG. 2 to their open position shown best in FIG. 6, their movement being about their described respective hinges 6 and 7 under the downward force exerted by bar 25 through pivoted links 18 and 19, bar 25 being lowered by collars 44 and 45 carried on rods 38, 39 when the entire structure rigidly secured to control block 29 is lowered by the described cam and spring action.

The first opening action of quadrants 4 and 5 of the mold causes each of them to begin to break away from the molded ball within the mold cavity at the separation line between the quadrants, being a separation line along a vertical plane through the mold cavity. As the barely started opening movement progresses, this break-away action progresses from its noted starting point (farthest away from hinges 6 and 7) to a culmination at points closest to the hinges, keeping in mind the partial liquid character of the moldable frozen product handled by the disclosed apparatus. As previously noted, the break-away action is enhanced as desired, particularly when the product is "running cold and stiff" by supplying heat externally to the quadrants 4 and 5 to cause the molded ball to tend to be covered with a more nearly melted film along the portion of the surface of the ball which is contacted by quadrants 4 and 5, such warming or external heating being accomplished by the described jets of warmed air through jet openings 100 of tubes 98, 99.

As the mold-control structure (including rods 38, 39) is lowered by the described cam action, bar 96 to which jet supply structure 97 to 99 is attached is correspondingly lowered from the mold-closed position shown in FIG. 2 to reach a considerably lowered position shown in FIG. 6 wherein the mold is fully open. This action brings jet tubes 98, 99 out of the path of the opening quadrants 4 and 5, and the reversal of this action as the mold closes bring the jet tubes back into effective warming relationship to the hinged quadrants of the mold.

As the mold-control structure is lowered from the closed-mold position, stripper-control link 49 (seen best in FIG. 7) is lowered by its attachment to rod 39 through block 48. The first portion of the downward movement of link 49 is ineffective to move members 53, 14, 13, 11, such movement occurring only when the top of slot 50 strikes pin or shoulder bolt 51 carried by lever 53, which occurs when 49 has been moved downward about halfway. The further downward movement carries lever 53 downward, which causes pin or shoulder bolt 16a in lever arm 16 to describe an arc about pivot member 15 and thus move somewhat inwardly along slot 53a in lever 53. The movement of arm 16 causes the described generally semicircular movement of cutting knife 10 (on shaft 11) to occur to separate the upper surface of the molded ball from the hemispherical upper surface of the inside of the mold and to cut the ball from the sprue within sprue passage, or inlet passage, 8 (FIG. 3) of shank 9 of the mold. Upon completion of this cutting and separating operation, the opening of the mold has been completed, and the severed and loosened molded ball drops upon the conveyor C4 (FIG. 1) for conveyance as described.

When, after the article last molded has been cut loose and dropped as described, the further rotation of cam 42 of FIGS. 4 and 8 causes the mold-control structure to be again lifted through cam lever 42a, the mold structure is moved from the described open position of FIG. 6 to the described closed position. It may be noted that stripper-control lever 53, because of the described slot 50 in lever 49, does not partake of the first portion of the upward movement, but obeys the final portion of the upward movement to return the associated parts 53, 16, 14, 12, 11, and 10 to their waiting position in readiness for a further operation.

Shortly after the upward movement of the mold-control apparatus has been completed, valve-control cam 94 again raises lever 93 (see FIG. 10) to again open control valve F12 through action of parts 92, F14, and F13. The next filling of the mold is thus begun, and it is terminated as described upon further movement of cam 94.

Referring again to the air-jet structure, tubes 97 to 99, in one commercial form of the apparatus, (1) the jet openings 100 of either tube 98, 99 are replaced by a single elongated slit, (2) the support bar 96 is placed above collars 44', 45' to bring the jet tubes upwardly toward the hinge location 6, 7 of the mold 1, and (3), the jet tubes 98, 99 are located further apart to avoid their striking the opening quadrants 4, 5 on the described downward movement of the jet tubes. In this modified construction, the warmed air discharged by the jet tubes plays up and down on the quadrants 4 and 5 to keep them relatively warm for the described break-away purpose, and the quadrants, when opened, shield the molded article from the warm-air jets.

While we have described above the principles of our invention in connection with specific apparatus, it is to be clearly understood that this description is made only by way of example and not as a limitation to the scope of our invention.

We claim:

1. A machine for making frozen comestibles, comprising the combination with a valve adapted to be connected to a source of pressurized comestible in a plastic condition, means for opening and closing said valve, and a rotary shaft with controls actuated thereby and connected with said means whereby said valve dispenses measured quantities of the comestible in a plastic condition, of apparatus for automatically molding the comestible to the desired shape, said apparatus including a mold having an upper portion with an opening through which the mold may be filled with a measured quantity of plastic comestible dispensed from said valve, said mold also having a pair of lower portions coacting with said upper portion to provide the desired shape of comestible, said lower portions being pivoted to said upper portion and arranged to swing in opposite directions therefrom to an open position, a stripper bar pivotally attached within said upper portion and conforming to the inner surface thereof, a first linkage connected with said lower portions to control the positions thereof, a second linkage connected with said stripper bar to control the actuation thereof, and means connected with said first and said second linkages, whereby said mold may be closed by said lower portions in timed relation to the rate of comestible flow through said valve, and whereby thereafter said lower portions are swingable from the molded comestible, and said stripper bar is actuale to release said molded comestible.

2. Automatic comestible molding apparatus comprising: a three-part mold, including an upper half portion having an opening for intermittently receiving comestible feed therethrough in plastic condition, and a pair of lower quarter portions, hinged to said half portion and arranged to swing in opposite senses; a stripper bar pivotally attached within said half portion and arranged to follow the inner surface thereof; a first linkage connected with said quarter portions whereby the same are swung in opposite directions from open to closed positions, and vice versa; a second linkage connected with said stripper bar for actuating the same to release molded comestibles from said mold; and control means connected with said first and said second linkage whereby said quarter portions and said stripper bar are operated in timed relation to each other and to the comestible feed through said opening to cause the mold to be closed while receiving comestible feed and to cause the stripper bar to operate while the mold is open.

3. Apparatus for automatically molding frozen comestible, comprising: a spherically shaped mold cut in its horizontal central plane to form an upper hemispheroid portion and a lower hemispheroid portion, the upper hemispheroid portion having an opening through which the mold may be filled intermittently, the lower hemispheroid portion being cut in a vertical central plane to form a pair of quadrants; means whereby the quadrants are hinged to the upper portion and arranged to swing in opposite directions therefrom to an open position to release a comestible formed in the mold; a stripper bar pivotally attached within the upper portion and arranged to follow the inner surface thereof; first linkage to position the quadrants; second linkage to actuate the stripper bar; and means for controlling the actuation of the linkages whereby the quadrants are closed during filling and the stripper bar is actuated contemporaneously with the positioning of the quadrants at open position.

4. Automatic frozen comestible molding apparatus for use with a valve and controls therefor arranged to dispense measured quantities of the comestible in plastic condition, said apparatus comprising: a mold including an upper portion and a lower portion, the upper portion having an opening through which the mold may be filled intermittently, the lower portion being hinged to the upper portion to close and open the mold at its bottom; means for positioning the mold lower portion and including means whereby the mold is opened and closed in timed relation to the intermittent comestible flow through said opening to be closed during filling and opened following filling, the said mold lower portion comprising two parts independently hinged to the upper portion and arranged to swing in opposite directions when moving between mold open and closed positions.

5. The apparatus described in claim 4 wherein the mold upper portion is hemispheroid in shape and the said two parts each are quadrants of a sphere.

6. Mold structure comprising a mold having a mold cavity wherein similar successive portions of a material of a given moldable consistency are received from the outlet of an intermittent source thereof, wherein each such portion is molded into a separate article, and from which each said molded article is discharged in substantially the said given moldable consistency, the mold comprising a stationary portion attachable to said outlet and containing a sprue passage which leads from the said outlet into the mold cavity, the mold further comprising a movable portion which, with the said stationary portion, defines the said mold cavity, means for moving the said movable portion toward and away from the stationary portion to close the mold for its molding operation and to open the mold for the said discharge of the molded article, and knife means operatively associated with the stationary portion of the mold and movable when said mold is opened to sever the molded article from the moldable material within the sprue passage and to define the outline of a substantial portion of the molded article within the stationary mold portion in addition to the sprue-contacting portion thereof.

7. In combination with mold structure according to claim 6, knife-control means for causing the movement of the knife means to occur, and means linking the knife-control means with the said means for moving the said movable portion of the mold, said linking means including lost-motion means for delaying the movement of said knife means until a substantial portion of the opening of the mold has occurred.

8. Mold structure according to claim 6, wherein the said stationary portion of the said mold extends downwardly from the said outlet and ends in a generally horizontal plane passing through the mold cavity, the said movable mold portion comprising a pair of similar quadrants hinged for coordinated movement about parallel axes located at opposite sides of the stationary portion near said plane to close the mold for filling and to open the mold to permit the molded article to drop from the mold upon severance of the molded article by said knife means.

9. In combination with mold structure comprising a cavity-containing mold which is intermittently closable to intermittently receive in its mold cavity a filling quantity of a moldable material of a given moldable consistency from an intermittent source thereof, each received quantity of material being molded into a separate article, the mold being operable following each said closure to discharge from its mold cavity the molded article in generally the said given consistency, wherein the said source of the said material includes means for supplying the said material from a bulk supply under pressure sufficient to cause a relatively rapid flow of the material to fill the said mold quickly when closed, a control valve interposed between the pressurized bulk supply and the said mold, the improvement which comprises means for repeatedly closing and opening the said mold at desired intervals, means for repeatedly opening said valve on each said mold closure to permit the said product to move under the said pressure to fill the said mold and for then closing the valve to terminate the said flow, and timing means included in the last said means for causing the said opening and the said closing of the said valve to both occur only while the said mold is closed and to cause the duration of the open period of the valve to be such that the quantity of the said product which flows through the opened valve during any said open period is approximately that quantity required to fill the said cavity of the closed mold.

10. Mold structure according to claim 9, wherein spring-pressed means is employed for holding the mold closed during the said filling thereof, the said spring-pressed means yielding to relieve excess pressure within the mold and to allow the mold to open part way to permit escape of any excess of the said moldable product which may be forced into the mold cavity during filling.

11. Apparatus for forming and severing a succession of portions of similar size and shape from a moldable product in bulk of the general consistency of ice cream, comprising supply means having an outlet, discharge-control means for causing the supply means to discharge a succession of portion quantities of said product through the outlet under pressure, a mold defining a mold cavity for receiving and molding any said discharged portion quantity into predetermined shape, the mold comprising a stationary mold part mounted to provide a passageway from the outlet into the mold cavity, the mold further comprising a plurality of similar movable mold parts which render the mold openable and closable, the stationary part defining one portion of the mold cavity, the movable parts defining the remainder of the mold cavity in closed position of the mold, means supporting each of the movable mold parts for turning about a separate axis to open and close the mold, the said axes being symmetrically disposed around the mold close to the stationary mold part, thereby reducing the angle through which they need to be swung to open and close the mold.

12. Apparatus according to claim 11, wherein the said movable parts comprise two opposed parts which, in the said closed position of the said mold means, meet along a plane passing centrally through the mold cavity about at right angles to the said common plane.

13. In an apparatus according to claim 11 for molding a refrigerated product of the class including ice cream, means for assisting the action of the said movable parts in breaking away from the molded product, comprising means for supplying heat to the movable parts for conduction therethrough to the surface of the molded product.

14. An apparatus according to claim 13, wherein the said means for supplying heat comprises means for directing jets of air to the said movable parts.

15. Apparatus according to claim 14, wherein the said means for supplying jets of air to the said movable parts is located comparatively close to such parts while the mold is in closed position, and means for moving the jet structure away from the movable parts incidental to the opening of the mold to bring it out of the path of such parts.

16. A machine for automatically molding comestibles, comprising: means for supplying the comestible in plastic condition; a mold in juxtaposition with said supplying means and including an upper portion having a port through which the mold may be filled with plastic comestible, and a positionable lower portion pivoted to said upper portion and arranged for opening and closing the mold at its bottom; means operatively associated with said mold upper portion for loosening mold contents therefrom; first means connected with said supplying means for controlling operation thereof; second means connected with said mold lower portion to control positioning thereof; third means connected with and controlling said means for loosening mold contents from said mold upper portion; and means for relatively timing the operation of said first, said second and said third means whereby said mold is closed during filling, and thereafter is opened and has its molded contents loosened from its upper portion for freeing of said contents from the mold, the mold lower portion being in two parts which are independently pivotally attached to said upper portion and arranged to be swung in opposite directions by said second means when moving between mold open and closed positions.

17. A machine for automatically molding comestibles, comprising: means for supplying the comestible in plastic condition; a mold in juxtaposition with said supplying means and including an upper portion having a port through which the mold may be filled with plastic comestible, and a positionable lower portion pivoted to said upper portion and arranged for opening and closing the mold at its bottom; means operatively associated with said mold upper portion for loosening mold contents therefrom; first means connected with said supplying means for controlling operation thereof; second means connected with said mold lower portion to control positioning thereof; third means connected with and controlling said means for loosening mold contents from said mold upper portion; and means for relatively timing the operation of said first, said second and said third means whereby said mold is closed during filling, and thereafter is opened and has its molded contents loosened from its upper portion for freeing of said contents from the mold, the mold being spherically shaped and being cut at its horizontal central plane to form an upper hemispheroid portion and a lower hemispheroid portion, said lower hemispheroid portion being cut in a vertical central plane to form a pair of quadrants hinged to said upper portion and arranged to be swung by said second means in opposite directions.

18. Mold structure comprising a mold having a mold cavity wherein similar successive portions of a material of a given moldable consistency are received from the outlet of an intermittent source thereof, wherein each such portion is molded into a separate article, and from which each said molded article is discharged into substantially the said given moldable consistency, the mold comprising a stationary portion attachable to said outlet and containing a sprue passage which leads from the said outlet into the mold cavity, the mold further comprising a movable portion which, with the said stationary portion, defines the said mold cavity, means for moving the said movable portion toward and away from the stationary portion to close the mold for its molding operation and to open the mold for the said discharge of the molded article, and knife means operatively associated with the stationary portion of the mold and movable to sever the molded article from the moldable material within the sprue passage and to define the outline of a substantial portion of the molded article within the stationary mold portion in addition to the sprue-contacting portion thereof, wherein the said stationary portion of the said mold extends downwardly from the said outlet and ends in a generally horizontal plane passing through the mold cavity, and said movable mold portion comprises a pair of similar quadrants hinged for coordinated movement about parallel axes located at opposite sides of the stationary portion near said plane to close the mold for filling and to open the mold to permit the molded article to drop from the mold upon severance of the molded article by said knife means, in combination with a horizontally extending conveyor having its receiving end portion disposed beneath the mold cavity to receive and convey horizontally the said molded article dropped from the mold, the path of the molded article along the conveyor being generally parallel to the said hinged axes, said knife means which severs the sprue being mounted within the said fixed part of the mold for a turning movement about an axis passing through both hinge locations and extending generally at right angles to the direction of conveyor movement, whereby any tendency for the molded articles to be diverted laterally by starting the drop before being completely severed and cut loose causes longitudinal, rather than lateral, displacement on the conveyor.

References Cited in the file of this patent

UNITED STATES PATENTS

| | | |
|---|---|---|
| 821,957 | Nicewarner | May 29, 1906 |
| 1,101,074 | Hayman | June 23, 1914 |
| 1,289,907 | Proper | Dec. 31, 1918 |
| 1,441,305 | Smallwood | Jan. 9, 1923 |
| 1,458,224 | Erman | June 12, 1923 |
| 1,774,708 | Gladish | Sept. 2, 1930 |
| 1,998,831 | Brubaker | Apr. 23, 1935 |
| 2,638,064 | Murphy | May 12, 1953 |
| 2,638,065 | Tarr | May 12, 1953 |
| 2,705,462 | Reinhard | Apr. 5, 1955 |
| 2,759,434 | Hensgen et al. | Aug. 21, 1956 |
| 2,774,104 | Miller | Dec. 8, 1956 |
| 2,850,051 | Rasmusson | Sept. 2, 1958 |
| 2,851,967 | Salerno | Sept. 16, 1958 |

FOREIGN PATENTS

| | | |
|---|---|---|
| 683,496 | Germany | Nov. 8, 1939 |